(12) United States Patent
Sakamoto et al.

(10) Patent No.: US 8,065,049 B2
(45) Date of Patent: Nov. 22, 2011

(54) VEHICLE DIAGNOSTIC CONTROL APPARATUS

(75) Inventors: Hiroyuki Sakamoto, Hitachinaka (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 532 days.

(21) Appl. No.: 12/329,286

(22) Filed: Dec. 5, 2008

(65) Prior Publication Data

US 2009/0150019 A1 Jun. 11, 2009

(30) Foreign Application Priority Data

Dec. 6, 2007 (JP) ................. 2007-316405

(51) Int. Cl.
*F01N 3/00* (2006.01)

(52) U.S. Cl. ....... 701/29; 701/123; 701/99; 180/65.275; 180/65.28; 903/904; 60/706; 60/276; 60/277

(58) Field of Classification Search ............. 180/65.265, 180/65.275, 65.28, 65.285; 701/29, 22, 123, 701/99; 60/698, 276, 706, 710, 277, 285; 903/904, 906, 930
See application file for complete search history.

(56) References Cited

U.S. PATENT DOCUMENTS

| | | | |
|---|---|---|---|
| 7,198,952 B2 * | 4/2007 | Uchida et al. ............ | 436/37 |
| 7,886,523 B1 * | 2/2011 | Legare .................... | 60/285 |
| 2004/0211168 A1 * | 10/2004 | Namiki .................... | 60/276 |
| 2007/0084195 A1 * | 4/2007 | Surnilla et al. .......... | 60/285 |
| 2007/0227124 A1 * | 10/2007 | Fujiki et al. ............. | 60/277 |
| 2009/0024263 A1 * | 1/2009 | Simon et al. ............. | 701/22 |

FOREIGN PATENT DOCUMENTS

| JP | 6-241026 A | 8/1994 |
|---|---|---|
| JP | 2000-104615 A | 4/2000 |
| JP | 2000-110650 A | 4/2000 |

* cited by examiner

*Primary Examiner* — Ruth Ilan

(74) *Attorney, Agent, or Firm* — Crowell & Moring LLP

(57) ABSTRACT

A vehicle includes an internal combustion engine 1 and a rotating electric machine 5 as drive power sources and drives a wheel using a driving force of the internal combustion engine 1 and/or the rotating electric machine 5. A diagnostic control unit 700 diagnoses the vehicle while controlling the same. The diagnostic control unit 700 shifts an operating point of the internal combustion engine 1 to a plurality of diagnostic operating points to diagnose a catalyst or an oxygen sensor. Meantime, the diagnostic control unit 700 compensates for an excess or a deficiency in the driving force of the internal combustion engine 1 accompanied by the shift of the operating point by letting the rotating electric machine 5 perform a power running or regeneration operation.

10 Claims, 16 Drawing Sheets

FIG.9

| | PURIFICATION RATE DETECTION RESULTS ||||||||| 
|---|---|---|---|---|---|---|---|---|
| DIAGNOSTIC RESULT 1 (LARGE GAS AMOUNT) | LOW ||| MEDIUM ||| HIGH |||
| DIAGNOSTIC RESULT 2 (SMALL GAS AMOUNT) | LOW | MEDIUM | HIGH | LOW | MEDIUM | HIGH | LOW | MEDIUM | HIGH |
| JUDGMENT | DETERIORATED | DETECTION FAILURE | DETECTION FAILURE | DETERIORATED | DETECTION FAILURE | DETECTION FAILURE | DETERIORATED | UNDEFINED | NORMAL |
| RESPONSE | DIAGNOSTIC COMPLETED | RE-DIAGNOSE | RE-DIAGNOSE | DIAGNOSTIC COMPLETED | RE-DIAGNOSE | RE-DIAGNOSE | DIAGNOSTIC COMPLETED | RE-DIAGNOSE | DIAGNOSTIC COMPLETED |

FIG.18

| | PURIFICATION RATE DETECTION RESULTS | | | | | | | | |
|---|---|---|---|---|---|---|---|---|---|
| | NORMAL | | | | ABNORMAL | | | | |
| DIAGNOSTIC RESULT 1 | NORMAL | — | — | | ABNORMAL | | | | |
| DIAGNOSTIC RESULT 2 | | NORMAL | | ABNORMAL | | NORMAL | | ABNORMAL | |
| DIAGNOSTIC RESULT 3 | | NORMAL | ABNORMAL | NORMAL | ABNORMAL | NORMAL | ABNORMAL | NORMAL | ABNORMAL |
| DIAGNOSTIC RESULT 4 | NORMAL | NORMAL | DETECTION FAILURE | NORMAL | ABNORMAL | NORMAL | DETECTION FAILURE | NORMAL | ABNORMAL |
| JUDGMENT | DIAGNOSTIC COMPLETED | DIAGNOSTIC COMPLETED | RE-DIAGNOSE | DIAGNOSTIC COMPLETED | DIAGNOSTIC COMPLETED | DIAGNOSTIC COMPLETED | RE-DIAGNOSE | DIAGNOSTIC COMPLETED | DIAGNOSTIC COMPLETED |
| RESPONSE | NORMAL | NORMAL | | ABNORMAL | ABNORMAL | NORMAL | | ABNORMAL | ABNORMAL | ns
VEHICLE DIAGNOSTIC CONTROL APPARATUS

BACKGROUND OF THE INVENTION

1. Field of the Invention

The present invention relates, in general, to vehicle diagnostic control apparatus and, more particularly, to a vehicle diagnostic control apparatus suitable for use in a hybrid vehicle.

2. Description of Related Art

One known technique for diagnosing exhaust system-related faults uses outputs from an oxygen sensor upstream of, and another oxygen sensor downstream of, a catalyst. The technique then uses a correlation function to quantify similarities in waveforms between the upstream and downstream oxygen sensors, thereby determining deterioration of the catalyst (see, for example, JP-A-6-241026).

In later years, hybrid vehicles using engines and motors to drive the vehicles are becoming popular. Some known technique uses a motor and a reverse ratio of an upstream oxygen sensor and a downstream oxygen sensor to determine the deterioration of the catalyst (see, for example, JP-A-2000-110650).

SUMMARY OF THE INVENTION

Even the technique disclosed in JP-A-2000-110650, however, poses a problem in that the exhaust system can be diagnosed only for a limited range of engine operating points.

It is an object of the present invention to provide a vehicle diagnostic control apparatus capable of diagnosing faults in a plurality of engine operating points and responding to an expanded diagnostic range.

(1) To achieve the foregoing object, a vehicle diagnostic control apparatus according to an aspect of the present invention is used for a vehicle having an internal combustion engine and a rotating electric machine as drive power sources and driving a wheel using a driving force of the internal combustion engine and/or the rotating electric machine. The vehicle diagnostic control apparatus includes a diagnostic control means that diagnoses, while controlling, the vehicle. The diagnostic control means diagnoses the vehicle by shifting an operating point of the internal combustion engine to a plurality of diagnostic operating points. Further, an excess or a deficiency in the driving force accompanied by the shift of the operating point of the internal combustion engine is compensated for by a power running or regeneration operation of the rotating electric machine.

(2) In the above-referenced (1), preferably, the vehicle includes a catalyst disposed at an exhaust pipe, the catalyst for purifying an exhaust gas, and air-fuel ratio sensors disposed upstream and downstream of the catalyst. The diagnostic control means judges deterioration of the catalyst using an output from the air-fuel ratio sensors.

(3) In the above-referenced (2), preferably, the diagnostic control means includes a diagnostic start judgment means for judging a diagnostic start based on a vehicle running mode and starts the diagnostic with an output signal from the diagnostic start judgment means.

(4) In the above-referenced (3), preferably, the diagnostic start judgment means judges a diagnostic start at a change in a driving force and the diagnostic control means, at the change in the driving force, increases the driving force of the internal combustion engine more than a request for the change in the driving force, while decreasing an output of the rotating electric machine in proportion to an amount of the driving force increased. Further, the diagnostic control means makes a first diagnosis of deterioration of the catalyst based on the output of the air-fuel ratio sensors before the change in the driving force and a second diagnosis of deterioration of the catalyst based on the output of the air-fuel ratio sensors after the change in the driving force, and judges the deterioration of the catalyst based on results of the first diagnosis and the second diagnosis.

(5) In the above-referenced (3), preferably, the diagnostic start judgment means judges a diagnostic start at a decrease in a battery charge amount and the diagnostic control means, at the decrease in the battery charge amount, increases the driving force of the internal combustion engine, while letting the rotating electric machine perform a regeneration operation in proportion to an amount of the driving force increased. Further, the diagnostic control means makes a first diagnosis of deterioration of the catalyst based on the output of the air-fuel ratio sensors before the increase in the driving force of the internal combustion engine and a second diagnosis of deterioration of the catalyst based on the output of the air-fuel ratio sensors after the increase in the driving force of the internal combustion engine, and judges the deterioration of the catalyst based on results of the first diagnosis and the second diagnosis.

(6) In the above-referenced (3), preferably, the diagnostic start judgment means judges a diagnostic start at a changeover from a running mode by the internal combustion engine only or by both the internal combustion engine and the rotating electric machine to a running mode by the rotating electric machine only and the diagnostic control means controls to change the running mode from the running mode by the internal combustion engine only or by both the internal combustion engine and the rotating electric machine to the running mode by the rotating electric machine only. Further, the diagnostic control means makes a first diagnosis of deterioration of the catalyst based on the output of the air-fuel ratio sensors during the running mode by the internal combustion engine only or by both the internal combustion engine and the rotating electric machine and a second diagnosis of deterioration of the catalyst based on the output of the air-fuel ratio sensors after the changeover to the running mode by the rotating electric machine only, and judges the deterioration of the catalyst based on results of the first diagnosis and the second diagnosis.

(7) In the above-referenced (3), preferably, the diagnostic start judgment means judges a diagnostic start at a gearshift and the diagnostic control means, at the gearshift, increases the driving force of the internal combustion engine more than a request for the change in the driving force after the gearshift, while decreasing an output of the rotating electric machine in proportion to an amount of the driving force increased. Further, the diagnostic control means makes a first diagnosis of deterioration of the catalyst based on the output of the air-fuel ratio sensors before the gearshift and a second diagnosis of deterioration of the catalyst based on the output of the air-fuel ratio sensors after the gearshift, and judges the deterioration of the catalyst based on results of the first diagnosis and the second diagnosis.

(8) In the above-referenced (3), preferably, the diagnostic start judgment means judges a diagnostic start upon the lapse of a predetermined period of time and the diagnostic control means, upon the lapse of the predetermined period of time, increases the driving force of the internal combustion engine, while letting the rotating electric machine perform a regeneration operation in proportion to an amount of the driving force increased. Further, the diagnostic control means makes a first diagnosis of deterioration of the catalyst based on the output of the air-fuel ratio sensors before the increase in the driving force of the internal combustion engine and a second diagnosis of deterioration of the catalyst based on the output of the air-fuel ratio sensors after the increase in the driving force of the internal combustion engine, and judges the deterioration of the catalyst based on results of the first diagnosis and the second diagnosis.

(9) In the above-referenced (1), preferably, the vehicle includes a catalyst disposed at an exhaust pipe, the catalyst for purifying an exhaust gas, and air-fuel ratio sensors disposed upstream and downstream of the catalyst. The diagnostic control means judges deterioration of the air-fuel ratio sensor, of the two air-fuel ratio sensors, disposed downstream of the catalyst using an output from the air-fuel ratio sensors.

(10) In the above-referenced (9), preferably, the vehicle diagnostic control apparatus further includes a diagnostic start judgment means for judging a diagnostic start at a changeover from a running mode by the internal combustion engine only or by both the internal combustion engine and the rotating electric machine to a running mode by the rotating electric machine only. The diagnostic control means controls to change the running mode from the running mode by the internal combustion engine only or by both the internal combustion engine and the rotating electric machine to the running mode by the rotating electric machine only with a fuel cut for the internal combustion engine. Further, the diagnostic control means makes a plurality of diagnoses of deterioration of the catalyst based on the output of the air-fuel ratio sensors during the running mode by the rotating electric machine only with the fuel cut for the internal combustion engine and judges the deterioration of the air-fuel ratio sensor downstream of the catalyst based on results of the plurality of diagnoses.

In accordance with the aspects of the present invention, the diagnosis can be made at a plurality of engine operating points and the diagnostic range can be expanded.

BRIEF DESCRIPTION OF THE DRAWINGS

FIG. 9 is a chart for illustrating the principle of judgment of deterioration of the catalyst given by the vehicle diagnostic control apparatus according to the embodiment of the present invention.

FIG. 18 is a chart for illustrating the details of diagnosis made for deterioration of the rear oxygen sensor according to the vehicle diagnostic control apparatus according to the embodiment of the present invention.

DESCRIPTION OF THE PREFERRED EMBODIMENTS

Arrangements and operations of a vehicle diagnostic control apparatus according to an embodiment of the present invention will be described below with reference to FIGS. 1 through 18.

The arrangements of the vehicle diagnostic control apparatus according to the embodiment of the present invention will first be described below with reference to FIG. 1.

Figure 1:
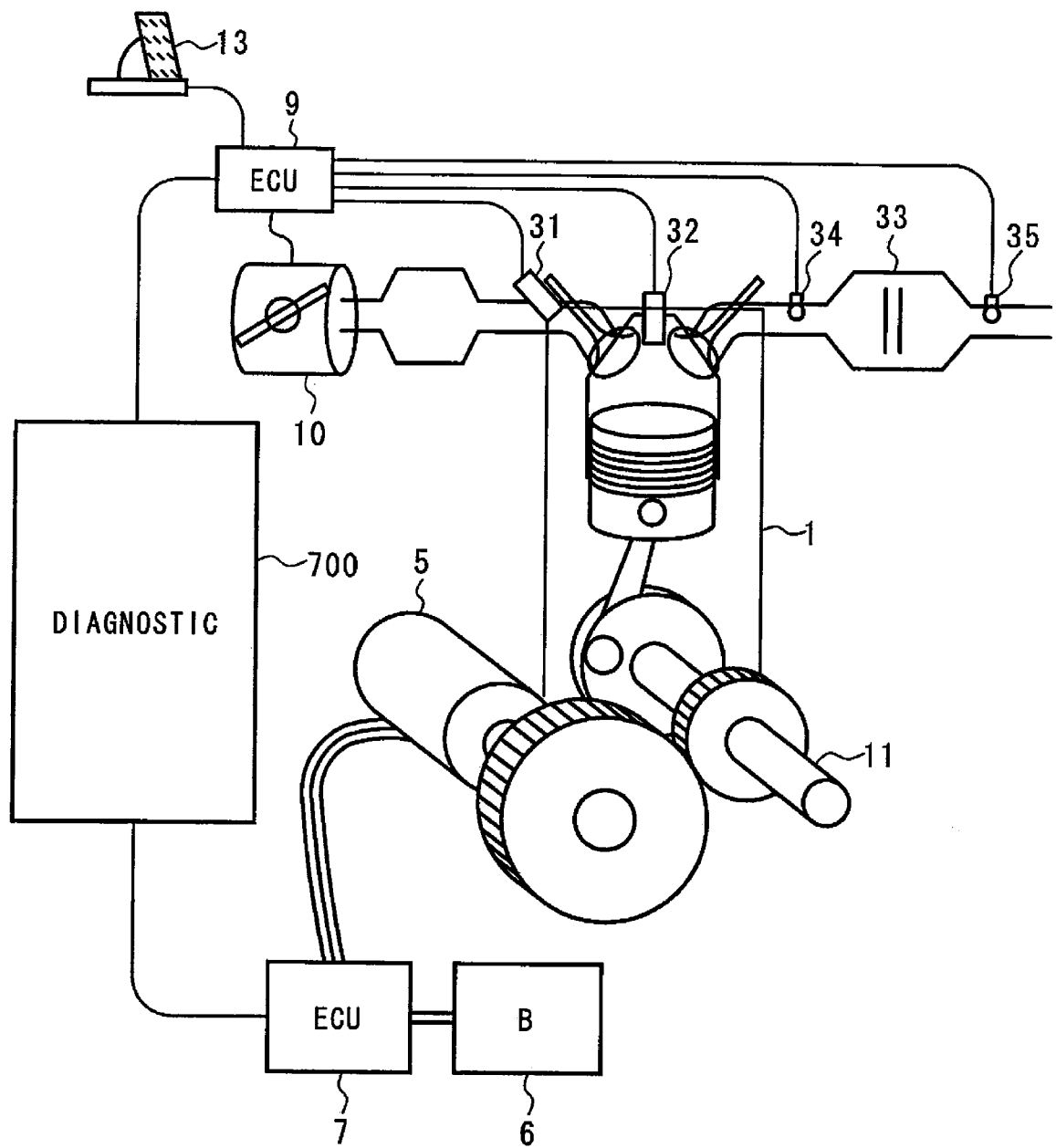
FIG. 1 is a block diagram showing a vehicle diagnostic control apparatus according to an embodiment of the present invention.

FIG. 1 is a block diagram showing the vehicle diagnostic control apparatus according to the embodiment of the present invention.

An internal combustion engine 1 draws air in through an electronic control throttle valve 10, compresses a mixture containing fuel injected by a fuel injector 31 and burns the mixture with an ignition plug, and then goes through strokes of expansion and exhaust. By repeating these strokes, the internal combustion engine 1 converts gasoline energy to a corresponding driving force. Exhaust gases discharged from the internal combustion engine 1 is purified by a catalyst 33 before being discharged through an exhaust pipe.

A front oxygen sensor 34 as an air-fuel ratio sensor is disposed on an upstream side of the catalyst 33 and a rear oxygen sensor 35 as another air-fuel ratio sensor is disposed on a downstream side of the catalyst 33. Exhaust gas properties before and after the catalyst 33 can thereby be observed.

The intake air for the internal combustion engine 1 is drawn in through the electronic control throttle valve 10. An internal combustion engine control unit (ECU) 9 controls the opening of the electronic control throttle valve 10 to control an intake air amount using a signal from an accelerator sensor disposed at an accelerator pedal 13 and a command from a diagnostic control unit 700.

A rotating electric machine 5 is connected to an input shaft 11 of a transmission 2 through a gear train. Driving forces of the internal combustion engine 1 and the rotating electric machine 5 make a vehicle drivable through the transmission 2. Arrangements of the rotating electric machine 5 and the transmission 2 will be described in detail later with reference to FIG. 3.

The rotating electric machine 5 is controlled by a rotating electric machine control unit (MCU) 7. The rotating electric machine 5 is capable of power running and regeneration operations. When the rotating electric machine 5 is used as a motor, the rotating electric machine control unit 7 supplies the rotating electric machine 5 with electric power from a battery (B) 6, thereby driving the rotating electric machine 5 as the motor. When the rotating electric machine 5 is used as a generator, the rotating electric machine 5 is driven by, for example, the internal combustion engine 1 and the electric power generated is stored in the battery 6.

In the vehicle diagnostic control apparatus configured as described above, the driving force of the vehicle can be controlled by the sum of the driving force of the internal combustion engine 1 and that of the rotating electric machine 5. Controlling the driving force of the rotating electric machine 5 to a negative side requires that the driving force of the internal combustion engine 1 be made greater. Conversely, even if the driving force of the internal combustion engine 1 is made greater, making the driving force of the rotating electric machine 5 negative allows an operating point of the internal combustion engine 1 to be controlled freely without changing the driving force of the vehicle.

The rotating electric machine 5 is connected to the input shaft 11 via a gear train as noted earlier. The rotating electric machine 5 may nonetheless be connected to the input shaft 11 through a belt or directly thereto without having any gear train intervening therebetween. Alternatively, the rotating electric machine 5 may even be connected to a rear stage of the transmission 2 as long as the rotating electric machine 5 is adapted to affect the input shaft 11.

Properties of the catalyst 33 and characteristics of the oxygen sensors 34, 35 used for diagnosis in the vehicle diagnostic control apparatus according to the embodiment of the present invention will be described below with reference to FIGS. 2 and 3a) to 3c).

Figure 2:
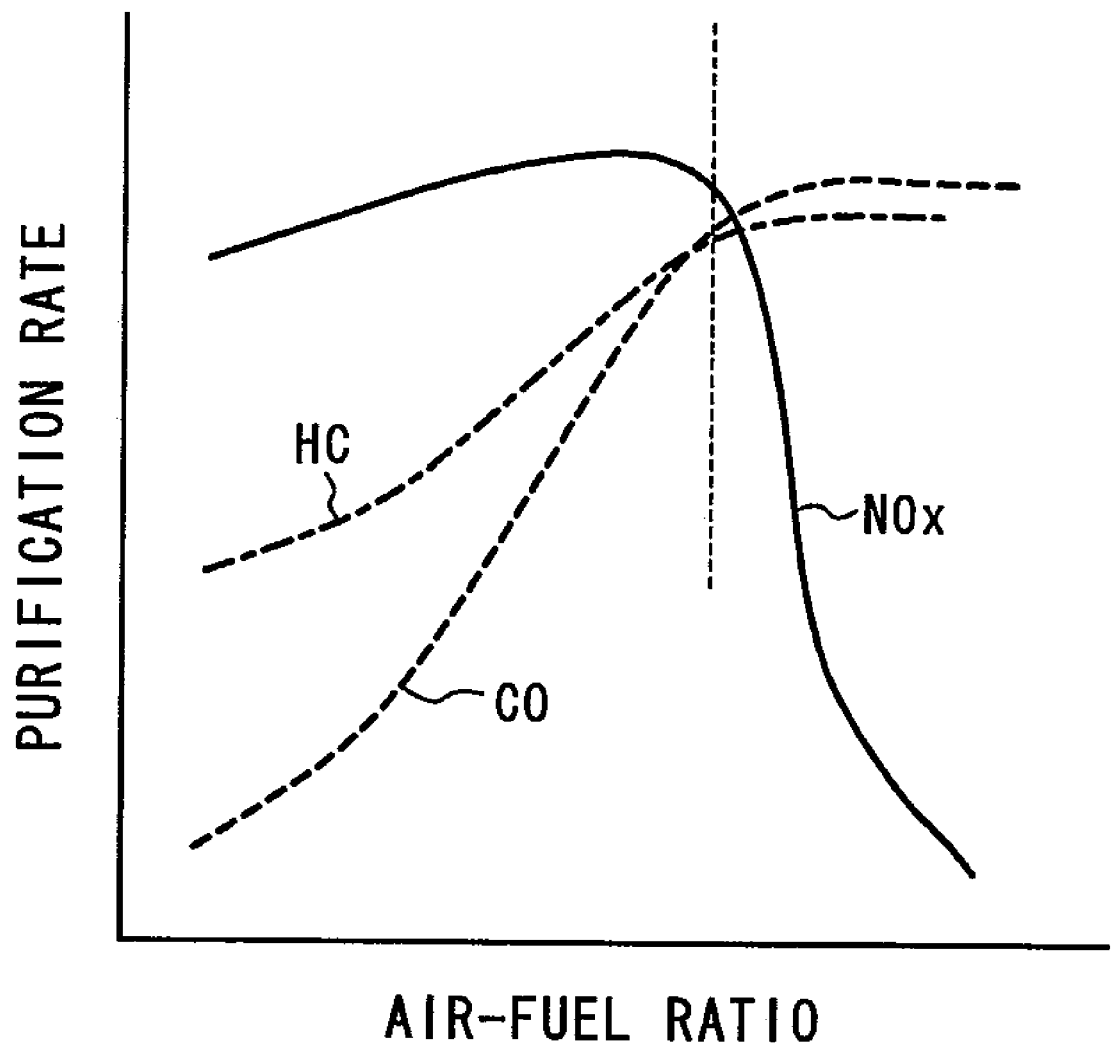
FIG. 2 is a graph for illustrating properties of a catalyst used for diagnosis in the vehicle diagnostic control apparatus according to the embodiment of the present invention.
Figure 3:
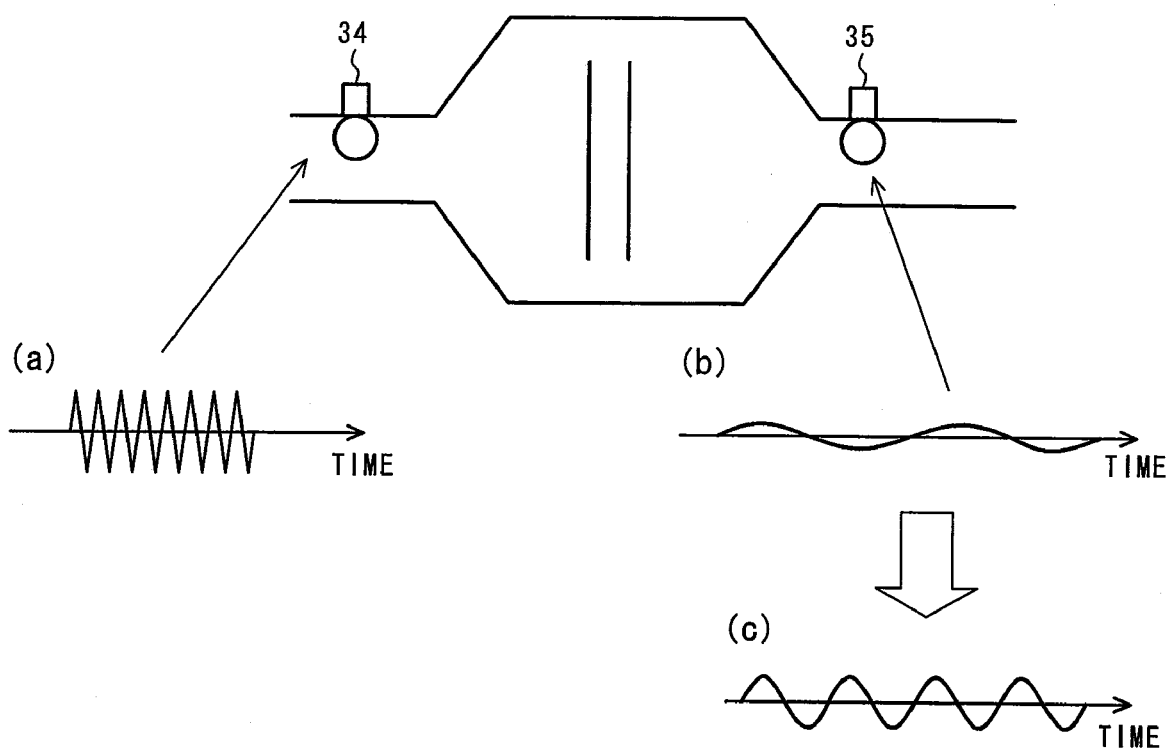
FIGS. 3a) to 3c) are graphs for illustrating characteristics of oxygen sensors used for diagnosis in the vehicle diagnostic control apparatus according to the embodiment of the present invention.

FIG. 2 is a graph for illustrating properties of the catalyst 33 used for diagnosis in the vehicle diagnostic control apparatus according to the embodiment of the present invention. FIGS. 3a) to 3c) are graphs for illustrating characteristics of the oxygen sensors 34, 35 used for diagnosis in the vehicle diagnostic control apparatus according to the embodiment of the present invention.

The catalyst 33 shown in FIG. 1 is a three-way catalyst that achieves the effect of purifying exhaust gases discharged from the internal combustion engine 1. The catalyst 33 exhibits the purifying properties as shown in FIG. 2. Specifically, the catalyst 33 offers high purification efficiency for HC, CO, and NOx when the air-fuel ratio, which is the ratio of intake air to fuel, is near the stoichiometric ratio. The catalyst 33 is only an exemplary embodiment and one purifying NOx only or one for purifying other types of exhaust gases may instead be used.

FIGS. 3a) to 3c) show output waveforms of the front oxygen sensor 34 and the rear oxygen sensor 35 for observing properties of the exhaust gas. The front, or upstream, oxygen sensor 34 directly observes the exhaust gas properties of the internal combustion engine 1. Feedback control is provided for controlling the air-fuel ratio of the internal combustion engine 1. In consideration of the oxidation-reduction reaction of the catalyst, the output waveform wiggles as shown in FIG. 3a). Oxygen concentration of the exhaust gas changes through the oxidation-reduction reaction as the exhaust gas passes through the catalyst. When the catalyst keeps high purification performance, the oxygen concentration changes only little as shown in FIG. 3b). As the catalyst is deteriorated, the oxygen concentration gradually becomes unstable and the signal of the rear oxygen sensor 35 starts to alternate, exhibiting a waveform closer to that of the front oxygen sensor 34 as shown in FIGS. 3b) and 3c).

Arrangements of a hybrid vehicle, in which the vehicle diagnostic control apparatus according to the embodiment of the present invention is mounted will be described below with reference to FIG. 4.

Figure 4:
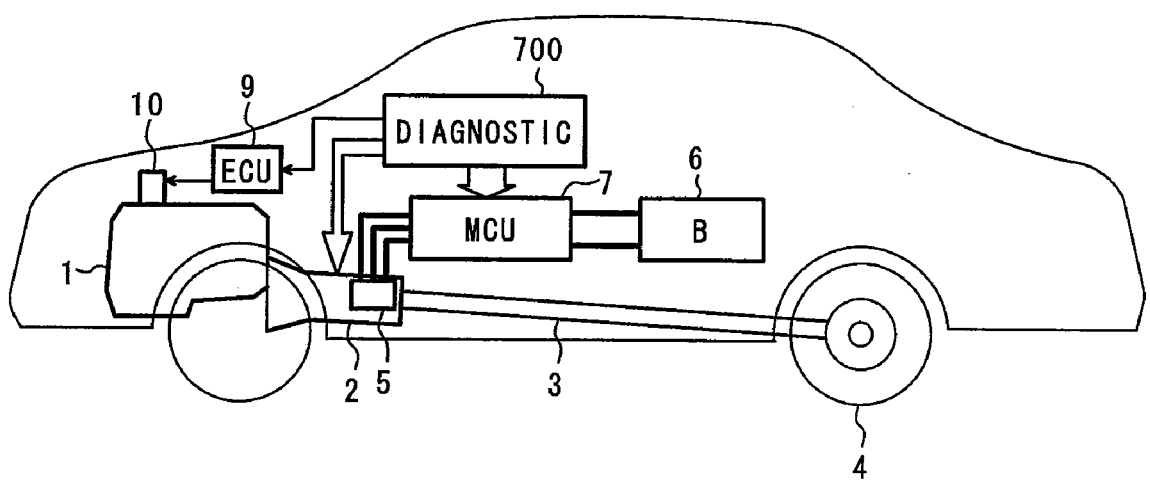
FIG. 4 is a block diagram showing a hybrid vehicle, in which the vehicle diagnostic control apparatus according to the embodiment of the present invention is mounted.

FIG. 4 is a block diagram showing the hybrid vehicle, in which the vehicle diagnostic control apparatus according to the embodiment of the present invention is mounted.

The internal combustion engine 1 of the hybrid vehicle is connected to the transmission 2, an output shaft 3 of which drives a tire 4 through a differential gear. The transmission 2 has the rotating electric machine 5 built therein. The rotating electric machine 5 connects to the rotating electric machine control unit (MCU) 7, or the motor control unit 7. The battery (B) 6 is mounted to serve as the power source for the motor control unit 7. The rotating electric machine 5 operates as the motor or the generator according to the motor control unit 7. The internal combustion engine 1 includes the electronic control throttle valve 10. The output of the internal combustion engine 1 can be controlled by controlling the throttle opening based on the control signal from the internal combustion engine control unit (ECU) 9.

The diagnostic control unit 700 controls torque and speed of the rotating electric machine (motor) 5 via the motor control unit 7. The diagnostic control unit 700 also controls the output of the internal combustion engine 1 via the internal combustion engine control unit (ECU) 9 and the electronic control throttle valve 10. In addition, the diagnostic control unit 700 issues an operation command to a shift actuator to effect a gearshift operation.

Arrangements of a hybrid system including an automated manual transmission (MT) and a rotating electric machine controlled by the vehicle diagnostic control apparatus according to the embodiment of the present invention will be described below with reference to FIG. 5.

Figure 5:
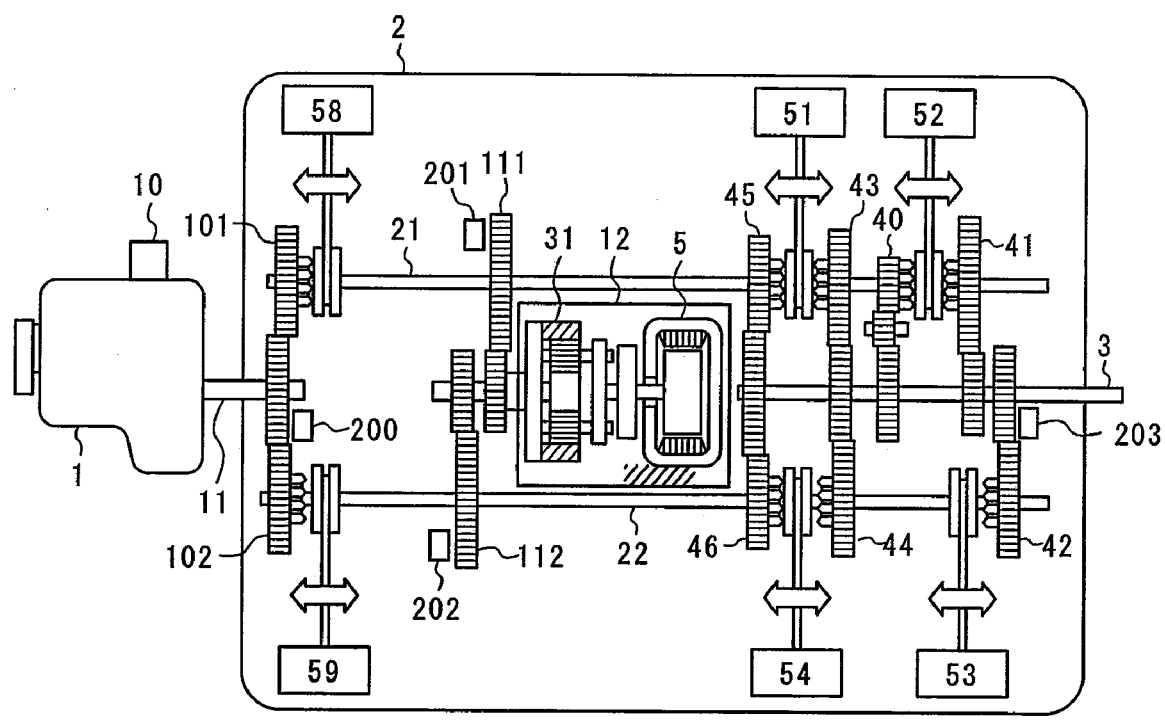
FIG. 5 is a block diagram showing a hybrid system including an automated manual transmission (MT) and a rotating electric machine controlled by the vehicle diagnostic control apparatus according to the embodiment of the present invention.

FIG. 5 is a block diagram showing the hybrid system including the automated manual transmission (MT) and the rotating electric machine controlled by the vehicle diagnostic control apparatus according to the embodiment of the present invention.

The transmission 2 includes the input shaft 11 and the output shaft 3. The input shaft 11 is connected to a drive shaft of the internal combustion engine 1, or a vehicle-drive power unit (engine) 1. The output (driving force) of the engine 1 can be varied by controlling the electronic control throttle valve 10 through the internal combustion engine control unit (ECU) 9, or a vehicle-drive power control unit 9.

The input shaft 11 of the transmission 2 is capable of transmitting or disconnecting the driving force of the vehicle-drive power unit 1 to a first intermediate shaft 21 and a second intermediate shaft 22 through dog clutches 58A, 59A. An input gear 101 is used to connect to the input shaft 11 to select the first intermediate shaft 21. An input gear 102 is used to connect to the input shaft 11 to select the second intermediate shaft 22. The first intermediate shaft 21 and the second intermediate shaft 22 are connected to the output shaft 3 through corresponding ones of transmission gears 40, 41, 42, 43, 44, 45, 46 via corresponding ones of dog clutches 51A, 52A, 53A, 54A. Each of the input shaft 11, the first intermediate shaft 21, the second intermediate shaft 22, and the output shaft 3 is provided with a corresponding one of speed measurement devices 200, 201, 202, 203 that detect the speed of the corresponding shaft.

The dog clutches 51A, 52A, 53A, 54A, 58A, 59A, which are connected to shift actuators 51, 52, 53, 54, 58, 59, can be engaged or disengaged by a propulsion force of the shift actuators 51, 52, 53, 54, 58, 59. The shift actuators 51, 52, 53, 54, 58, 59, which are controlled by a transmission control unit (ATCU) 8, are a commonly found type applicable to automatization, to which a motor or hydraulic drive system may be applied. Detailed descriptions will be omitted of the dog clutch and actuator which are both well-known art. Additionally, each of the shift actuators 51, 52, 53, 54, 58, 59 includes a detector detecting an engaged or disengaged position of the corresponding one of the dog clutches 51A, 52A, 53A, 54A, 58A, 59A. A commercially available position sensor may be used for the detector.

Further, the first intermediate shaft 21 is connected to a first shaft of a gearshift power unit (accelerator pedal) 13 via a gear 111. The second intermediate shaft 22 is connected to a second shaft of the gearshift power unit 12 via a gear 112.

The gearshift power unit 12 includes the rotating electric machine 5 and a planetary gear mechanism 31. The rotating electric machine 5 has a rotary shaft connected to a planetary gear of the planetary gear mechanism 31. The second intermediate shaft 22 is connected to a sun gear. A ring gear is connected to the first intermediate shaft 21. Differential gearing may be used in place of the planetary gear mechanism 31. Accordingly, a power of the rotating electric machine 5 acts on the first intermediate shaft 21 and the second intermediate shaft 22. An arrangement is made to make the power of the rotating electric machine 5 act on a side of the first intermediate shaft 21 and a side of the second intermediate shaft 22 in opposite directions from each other. For example, if a connection is made to increase the speed of the first intermediate shaft 21 when positive torque is applied to the rotating electric machine 5, a connection is made such that torque applied to the side of the second intermediate shaft 22 acts to reduce the speed. The speed and torque of the rotating electric machine 5 is controlled by the motor control unit (MCU) 7.

Input/output signals of the vehicle diagnostic control apparatus according to the embodiment of the present invention will be described below with reference to FIG. 6.

Figure 6:
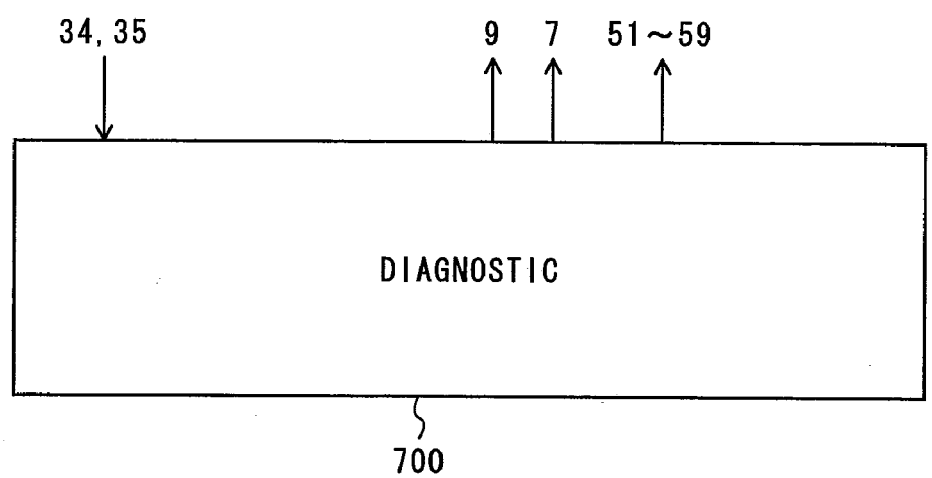
FIG. 6 is a diagram for illustrating input/output signals of the vehicle diagnostic control apparatus according to the embodiment of the present invention.

FIG. 6 is a diagram for illustrating the input/output signals of the vehicle diagnostic control apparatus according to the embodiment of the present invention.

The diagnostic control unit 700 diagnoses the catalyst 33, the rear oxygen sensor 35, or the rotating electric machine 5 at a plurality of engine operating points, while supplementing a power of the internal combustion engine 1 with that of the rotating electric machine 5.

The diagnostic control unit 700 outputs a control signal to the internal combustion engine control unit 9 to control the internal combustion engine 1. Similarly, the diagnostic control unit 700 outputs a control signal to the rotating electric machine control unit 7 to control the rotating electric machine 5. At this time, the diagnostic control unit 700 achieves a plurality of engine operating points, while supplementing the power of the internal combustion engine 1 with that of the rotating electric machine 5. Then, at the plurality of engine operating points, the diagnostic control unit 700 reads an output signal from the front oxygen sensor 34 and that of the rear oxygen sensor 35 to thereby diagnose the catalyst 33 or the rear oxygen sensor 35.

In addition, the diagnostic control unit 700 issues an operation command to the shift actuators 51, 52, 53, 54, 58, 59 to effect a gearshift operation.

The configuration of the vehicle diagnostic control apparatus according to the embodiment of the present invention will be described below with reference to FIG. 7.

Figure 7:
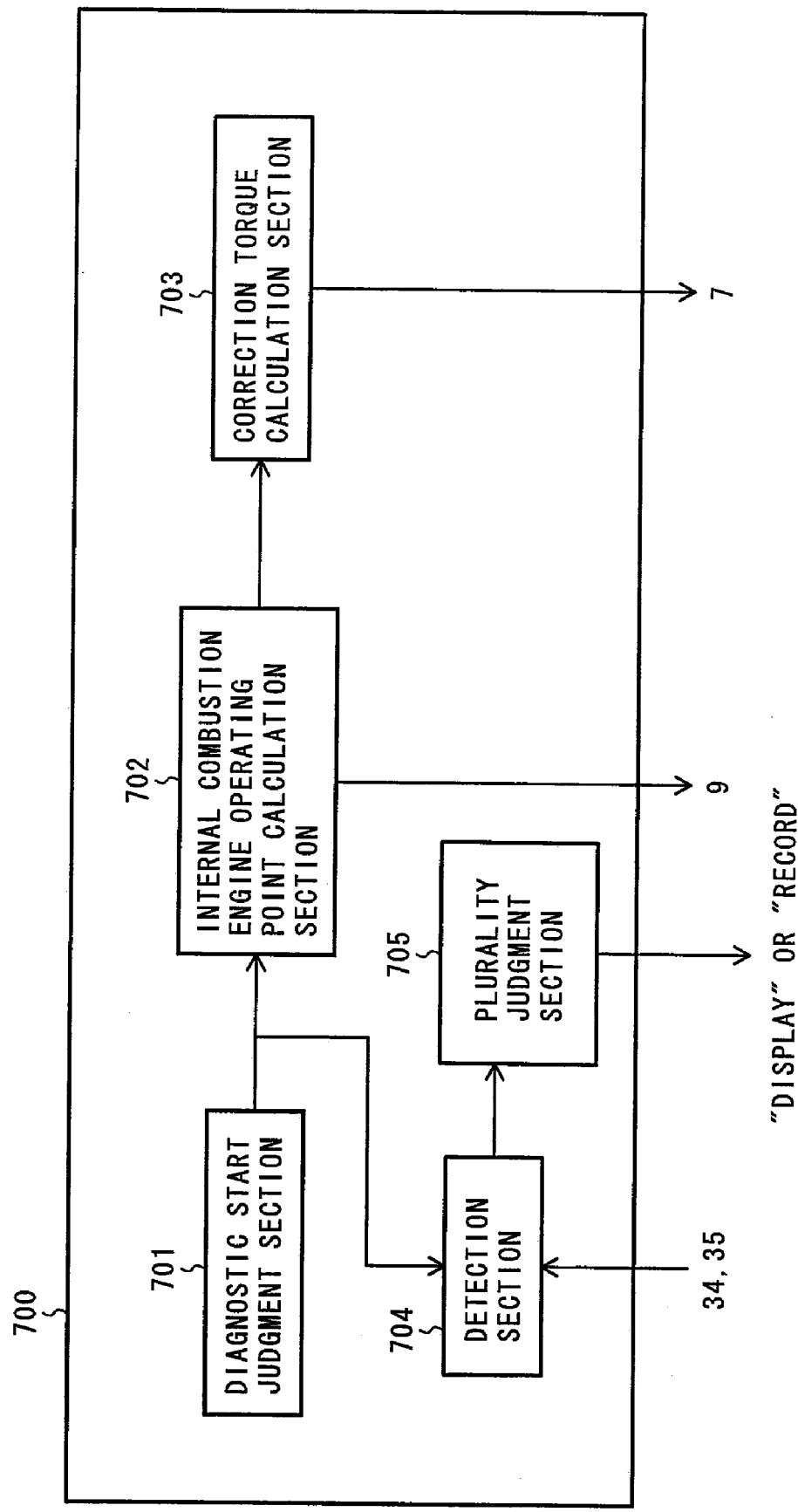
FIG. 7 is a block diagram showing the configuration of the vehicle diagnostic control apparatus according to the embodiment of the present invention.

FIG. 7 is a block diagram showing the configuration of the vehicle diagnostic control apparatus according to the embodiment of the present invention.

The diagnostic control unit 700 includes a diagnostic start judgment section 701, an internal combustion engine operating point calculation section 702, a correction torque calculation section 703, a detection section 704, and a plurality judgment section 705.

The principle of judgment of deterioration of the catalyst given by the vehicle diagnostic control apparatus according to the embodiment of the present invention will be described below with reference to FIGS. 8 and 9.

Figure 8:
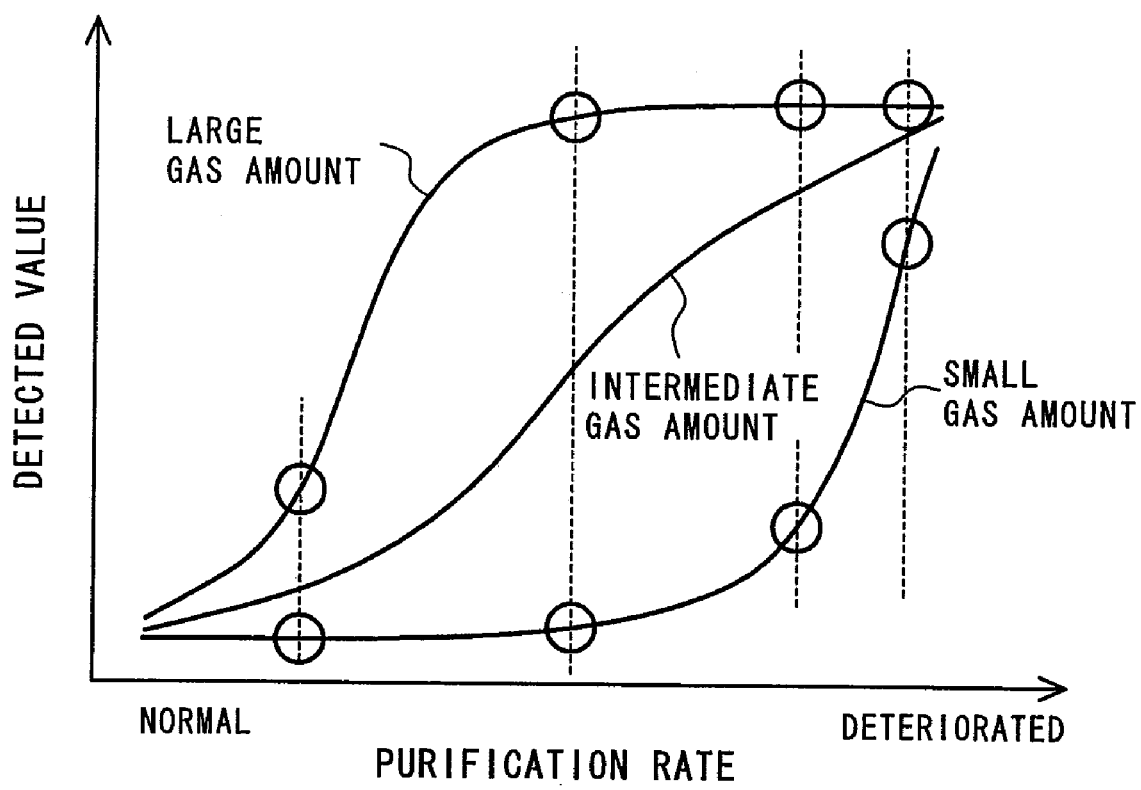
FIG. 8 is a graph for illustrating the principle of judgment of deterioration of the catalyst given by the vehicle diagnostic control apparatus according to the embodiment of the present invention.

FIG. 8 is a graph and FIG. 9 is a chart for illustrating the principle of judgment of deterioration of the catalyst given by the vehicle diagnostic control apparatus according to the embodiment of the present invention.

FIG. 8 shows the relationship between the purification rate of the catalyst and the value detected by the oxygen sensor for each of different gas amounts. In the systems disclosed in JP-A-6-241026 and JP-A-2000-110650, the detected value exhibits a poor linearity relative to the purification rate when the gas amount is large or small, which requires that diagnosis be made with the intermediate gas amount. The gas amount is intermediate when the internal combustion engine is running under a medium load.

Such a running state with the intermediate gas amount occurs less frequently, unless the driver intentionally makes one. Think, for example, of city street running. The vehicle is first accelerated at a mild acceleration rate up to a predetermined vehicle speed and then driven at the constant vehicle speed. Even if the gas amount becomes intermediate within a predetermined period of time where acceleration is necessary, the vehicle is run at the constant speed as the vehicle speed builds up, resulting in a small gas amount. Think, this time, of driving on an expressway. After the vehicle is accelerated at a high acceleration rate (with a large gas amount) to enter the driving lane by way of the ramp, the accelerator pedal is returned for cruising, resulting in a small gas amount.

If the system can be diagnosed even with the small or large gas amount only, accuracy of the diagnosis is enhanced. The embodiment of the present invention is characterized in that the system is diagnosed at a plurality of diagnostic points.

The principle of judgment of deterioration of the catalyst given by the vehicle diagnostic control apparatus according to the embodiment of the present invention will be described below with reference to FIG. 9. Given the diagnostic results for both large and small gas amounts and having the details as shown in FIG. 9, if, for example, the purification rate is low in the diagnostic results of the large gas amount and the purification rate is also low in the diagnostic results of the small gas amount, the purification rate may be judged to be low. Similarly, no data is available for a case with a low purification rate for the large gas amount and an intermediate or high purification rate for the small gas amount, so that it can be judged that the diagnostic detection results are problematic. As such, the diagnostic accuracy can be enhanced by using a plurality of diagnostic results.

Note herein that the large gas amount results in a large engine output and the small gas amount results in a small engine output, which causes the vehicle driving force to fluctuate. Vehicle driving forces varied for the purpose of diagnostic may give the driver an uncomfortable or unpleasant sensation. In the vehicle diagnostic control apparatus according to the embodiment of the present invention, the rotating electric machine 5 is used to stabilize the driving force. To stabilize the driving force, the output of the rotating electric machine 5 is controlled such that the sum of the engine output and the output of the rotating electric machine 5 calculated from the engine operating points for the large gas amount and the small gas amount is close to a driver's or vehicle performance target driving force. Note that the target driving force can be set based on information including the accelerator opening.

From the foregoing, in the systems disclosed in JP-A-6-241026 and JP-A-2000-110650, the engine operating point is changed to achieve the intermediate gas amount in order to detect deterioration for the catalyst deterioration diagnostic. In accordance with the vehicle diagnostic control apparatus according to the embodiment of the present invention, however, judgment can be made for diagnosis made at two points based on the gas amounts extremely different from each other as shown in FIG. 9, instead of using the intermediate gas amount.

As described above, the diagnostic performance can be improved by changing, during the diagnostic procedure, the plurality of operation points of the internal combustion engine 1, while controlling the driving force of the rotating electric machine 5. For the diagnostic, however, it is necessary to change the operating point to a plurality of points. Though the driving force can be supplemented using the rotating electric machine 5, the diagnostic can be made even more easily if the plurality of operating points is created through a change of the driving force by the driver's intention or the like.

The diagnostic start judgment section 701 shown in FIG. 7 determines whether or not to make such a diagnosis, identifies operating conditions to be diagnosable at the plurality of operating points. The following factors are possible that cause the operating point of the internal combustion engine 1 to change in running conditions of the hybrid vehicle.

Changing the driving force by changing the accelerator opening or the like

Changing the engine operating point for the purpose of power generation or the like as a result of a change in the battery charge amount or the like Changing the vehicle running modes as follows: EV running→HEV running→EV running Effecting a gearshift operation The hybrid vehicle involves situations of changing the engine operating points as listed above.

Referring to FIG. 7, when an accelerator opening and other signals are inputted and a preset judgment condition is met, the diagnostic start judgment section 701 determines that the diagnostic can be started. Based on this judgment result, the internal combustion engine operating point calculation section 702 determines the engine operating point. The information on the engine operating point determined by the internal combustion engine operating point calculation section 702 is outputted to the internal combustion engine control unit 9. The internal combustion engine control unit 9 then controls the internal combustion engine 1 to achieve the engine operating point. The correction torque calculation section 703 determines the torque of the rotating electric machine 5 using the engine operating point determined by the internal combustion engine operating point calculation section 702 and the target driving force or a target driving torque. The information on the torque of the rotating electric machine 5 determined by the correction torque calculation section 703 is outputted to the rotating electric machine control unit 7 which, in turn, controls the rotating electric machine 5 to achieve the torque of the rotating electric machine 5.

The diagnostic start judgment section 701 detects diagnostic information at the detection section 704 by outputting a diagnostic start command thereto. The output signals from the oxygen sensors 34, 35 are inputted to the detection section 704. The plurality judgment section 705 makes a judgment based on the diagnostic results (diagnostic result 1 or 2 shown in FIG. 9) produced by the detection section 704.

Details of judgment given by the diagnostic start judgment section 701 in the vehicle diagnostic control apparatus according to the embodiment of the present invention will be described below with reference to FIG. 10.

Figure 10:
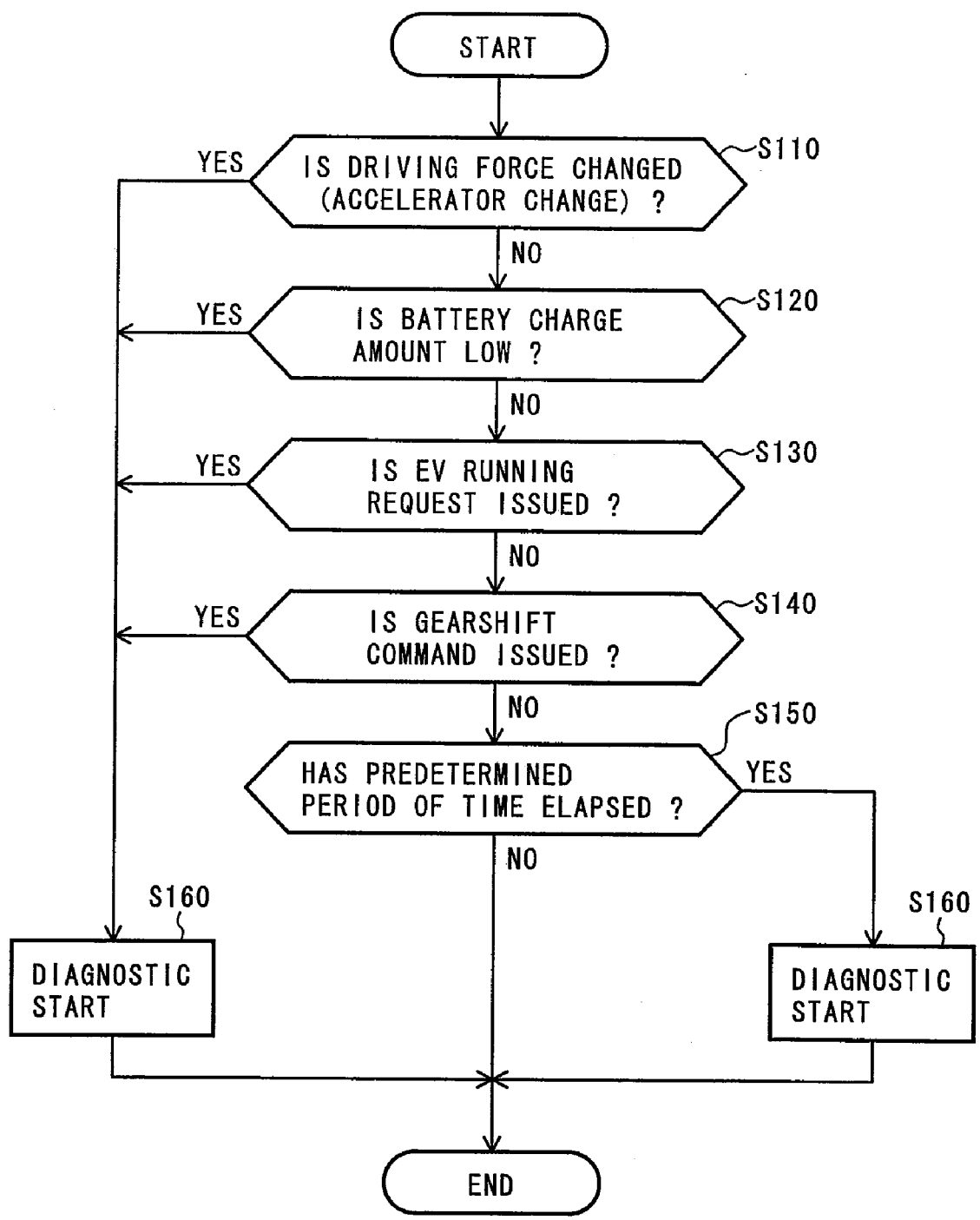
FIG. 10 is a flowchart showing details of judgment given by a diagnostic start judgment section in the vehicle diagnostic control apparatus according to the embodiment of the present invention.

FIG. 10 is a flowchart showing details of judgment given by the diagnostic start judgment section 701 in the vehicle diagnostic control apparatus according to the embodiment of the present invention.

The vehicle running mode is detected in steps S110 to S140 of FIG. 10 and it is determined whether or not the running mode is suitable for diagnostic start.

Specifically, in step S110 of FIG. 10, the diagnostic start judgment section 701 determines whether or not there is a change in the driving force. The change in the driving force is detected, for example, from a change in the accelerator opening. If there is a change in the driving force, the operation proceeds to step S160 and a diagnostic start command is issued. Specific details of the diagnostic at this time will be described later with reference to FIG. 12.

In step S120, the diagnostic start judgment section 701 determines whether or not the battery charge amount is low. For example, if the charge of the battery 6 is small during running at a constant speed, the hybrid vehicle needs power generation using the rotating electric machine 5. The engine operating point is therefore changed from a low torque state to a high torque state to generate power using the rotating electric machine 5, thereby attempting to increase the battery charge amount, while maintaining a predetermined level of power performance. If the diagnostic start is judged at this timing, diagnostic at a plurality of engine operating points can be made easily. If the battery charge amount is low, the operation proceeds to step S160 and a diagnostic start command is issued. Specific details of the diagnostic at this time will be described later with reference to FIG. 13.

In step S130, the diagnostic start judgment section 701 determines whether or not there is an EV running request. If there is an EV running request, the operation proceeds to step S160 and a diagnostic start command is issued. Specific details of the diagnostic at this time will be described later with reference to FIG. 14.

In step S140, the diagnostic start judgment section 701 determines whether or not there is a gearshift command. If there is a gearshift command, the operation proceeds to step S160 and a diagnostic start command is issued. Specific details of the diagnostic at this time will be described later with reference to FIG. 15.

Further in step S150, the diagnostic start judgment section 701 determines whether or not a predetermined period of time has elapsed. In steps S110 to S140, the vehicle diagnostic control apparatus according to the embodiment of the present invention judges the diagnostic start in accordance with changes in the vehicle conditions. If there are no changes in the vehicle conditions, the vehicle diagnostic control apparatus according to the embodiment of the present invention can create the similar conditions after the lapse of a predetermined period of time.

For example, the condition in which the vehicle is run at a constant speed can be frequently imagined and, in such a condition, the engine output remains low (gas amount is insufficient), so that the engine output needs to be increased in order to make a diagnosis at a plurality of engine operating points. In this case, while the engine output is increased, the rotating electric machine 5 is used to generate power to maintain a given driving force at a constant level. The diagnostic start judgment section 701 uses a timer to output a diagnostic start command upon the lapse of a predetermined period of time.

If the battery charge amount is high, however, power generation using the rotating electric machine 5 is difficult. In this case, the rotating electric machine 5 is operated in the power running mode to meet driving force requirements, while preventing the target driving force from being achieved even by shifting gears into a high-speed side to increase the engine output.

In addition, the energy stored in the battery can be consumed through EV running.

After the lapse of the predetermined period of time, the operation proceeds to step S160 and a diagnostic start command is issued. Specific details of the diagnostic at this time will be described later with reference to FIG. 13.

The diagnostic start command issued by the diagnostic start judgment section 701 outputs the diagnostic start timing to the internal combustion engine operating point calculation section 702 and the detection section 704, thereby detecting the diagnostic information in the detection section 704, while letting the internal combustion engine operating point calculation section 702 control the engine and the correction torque calculation section 703 control the motor. The plurality judgment section 705 makes a judgment based on the detection results (diagnostic result 1 or 2 shown in FIG. 9).

Details of diagnosis made by the vehicle diagnostic control apparatus according to the embodiment of the present invention will be described below with reference to FIG. 11.

Figure 11:
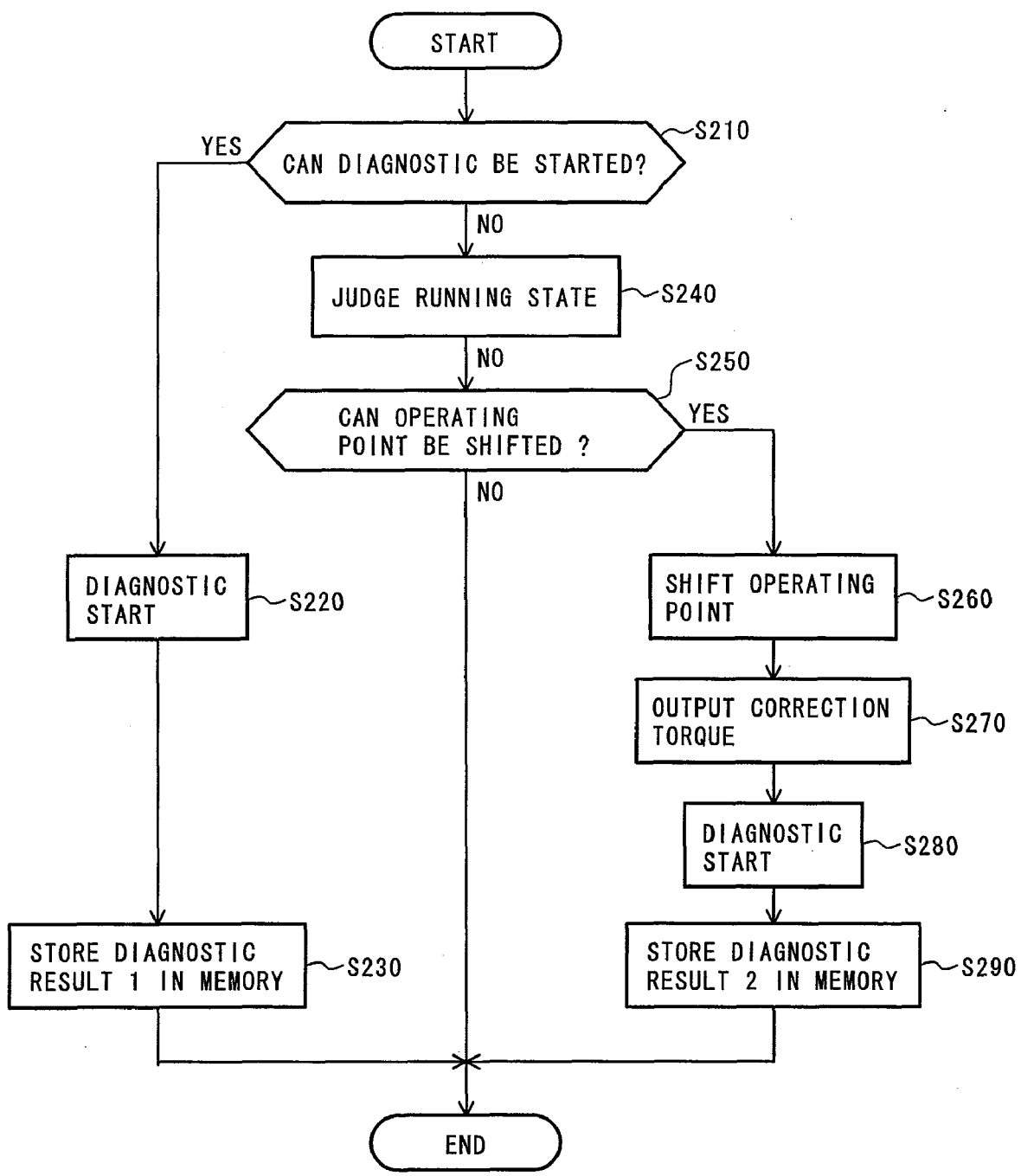
FIG. 11 is a flowchart showing details of diagnosis made by the vehicle diagnostic control apparatus according to the embodiment of the present invention.
Figure 12:
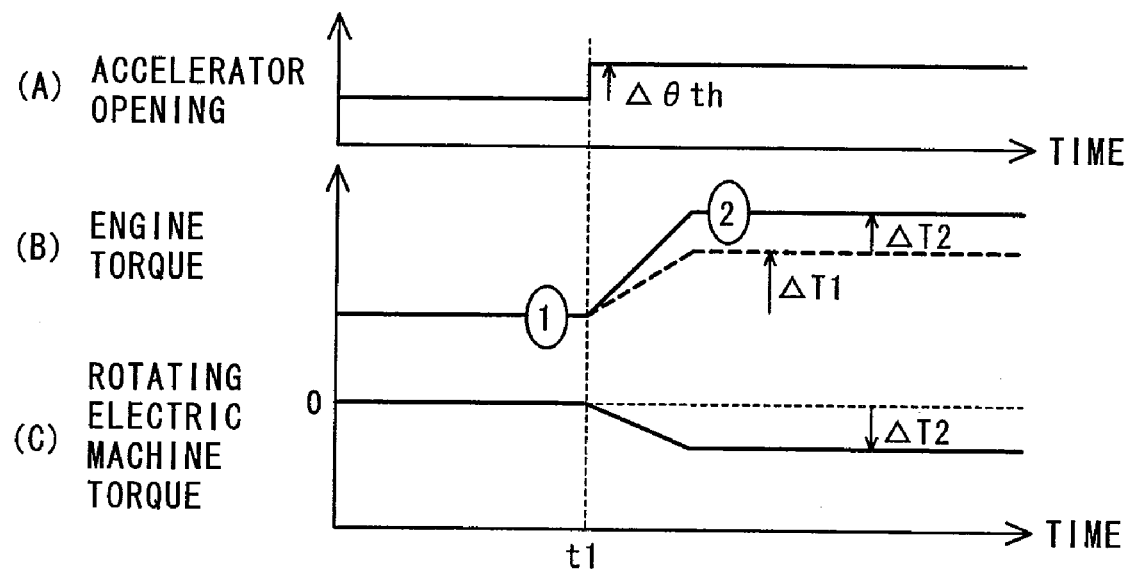
FIGS. 12(A) to 12(C) are timing charts showing details of diagnostic control for step S110 (driving force change) of FIG. 10 in the vehicle diagnostic control apparatus according to the embodiment of the present invention.

FIG. 11 is a flowchart showing the details of diagnosis made by the vehicle diagnostic control apparatus according to the embodiment of the present invention.

In step S210 of FIG. 11, the diagnostic start judgment section 701 determines whether or not the diagnostic can be started according to the judgment of FIG. 10. If the diagnostic can be started, in step S220, the system lets the detection section 704 read the output signals from the oxygen sensors 34, 35 and starts the diagnostic. Then, in step S230, the plurality judgment section 705 stores in memory the diagnostic result (diagnostic result 1) for the operation of the ordinary engine operating point or diagnostic operating point.

After the diagnostic is started, the diagnostic start judgment section 701 determines, in step S240, the vehicle running condition and, in step S250, determines whether or not an operating point shift is enabled.

If the operating point shift is enabled, the system lets the internal combustion engine operating point calculation section 702 control the engine in step S260 to shift the engine operating point. Further, in step S270, the system lets the correction torque calculation section 703 control the motor to output a correction torque.

Then, in step S280, the system lets the detection section 704 read the output signals from the oxygen sensors 34, 35 and starts the diagnostic. Then, in step S290, the plurality judgment section 705 stores in memory the diagnostic result (diagnostic result 2) for the operation of the diagnostic operating point after the operating point shift. The plurality judgment section 705 makes a judgment shown in FIG. 9, so that the diagnosis can be made at a plurality of operating points and diagnostic accuracy can be enhanced.

If the operating point is shifted to the next after the diagnostic results 1 and 2 are stored in memory, the diagnostic result 3 may be used or the diagnostic result 2 may be stored in memory as the diagnostic result 1.

Details of diagnostic control for step S110 (driving force change) of FIG. 10 in the vehicle diagnostic control apparatus according to the embodiment of the present invention will be described below with reference to FIGS. 12(A) to 12(C).

FIGS. 12(A) to 12(C) are timing charts showing details of diagnostic control for step S110 (driving force change) of FIG. 10 in the vehicle diagnostic control apparatus according to the embodiment of the present invention.

In FIGS. 12(A) to 12(C), the abscissa represents time. In FIG. 12(A), the ordinate represents accelerator opening. In FIG. 12(B), the ordinate represents engine torque. In FIG. 12(C), the ordinate represents rotating electric machine torque.

When the accelerator opening changes as shown in FIG. 12(A) at a time t1, the (diagnostic result 1) is obtained from the output signal from the oxygen sensor at that particular point in time as shown in FIG. 12(B) and stored in memory in the plurality judgment section 705.

Then, in accordance with the changes in the accelerator opening, the system uses the internal combustion engine operating point calculation section 702 to control the engine and shifts the engine operating point. Note at this time the following. Specifically, let $\Delta T1$ indicated by a broken line in FIG. 12(B) be an increase in the engine torque corresponding to an increase in the accelerator opening, then the internal combustion engine operating point calculation section 702 controls the internal combustion engine 1 such that the engine torque indicated by a solid line in FIG. 12(B) increases by $\Delta T1+\Delta T2$. Assume, on the other hand, that the rotating electric machine operates neither as a motor nor a generator at this time with its torque being 0. The correction torque calculation section 703 then controls the rotating electric machine as the generator and outputs the correction torque $-\Delta T2$.

Specifically, when the driving force is changed, the driving force of the internal combustion engine is increased by $\Delta T2$ relative to the driving force change request, while the output of the rotating electric machine is reduced by $\Delta T2$.

When the internal combustion engine shifts to a second operating point as described above, the (diagnostic result 2) is obtained from the output signal from the oxygen sensor at that particular point in time as shown in FIG. 12(B) and stored in memory in the plurality judgment section 705.

The plurality judgment section 705 makes a judgment shown in FIG. 9, so that the diagnosis can be made at a plurality of operating points and diagnostic accuracy can be enhanced.

As a method for diagnosing deterioration from the changes in the waveforms of the front oxygen sensor and rear oxygen sensor, a technique may use a correlation function to quantify similarities in waveforms between the front and rear oxygen sensors, as disclosed in JP-A-6-241026. Another technique may use a reverse ratio of the front and rear oxygen sensors to determine the deterioration, as disclosed in JP-A-2000-110650.

Details of diagnostic control for step S120 (battery charge amount drop) of FIG. 10 in the vehicle diagnostic control apparatus according to the embodiment of the present invention will be described below with reference to FIGS. 13(A) to 13(C).

FIGS. 13(A) to 13(C) are timing charts showing details of diagnostic control for step S120 (battery charge amount drop) of FIG. 10 in the vehicle diagnostic control apparatus according to the embodiment of the present invention.

In FIGS. 13(A) to 13(C), the abscissa represents time. In FIG. 13(A), the ordinate represents battery charge amount still available for use. In FIG. 13(B), the ordinate represents engine torque. In FIG. 13(C), the ordinate represents rotating electric machine torque.

When the battery charge amount drops to a level lower than a predetermined value SOC1 as shown in FIG. 13(A) at a time t2, the (diagnostic result 1) is obtained from the output signal from the oxygen sensor at that particular point in time as shown in FIG. 13(B) and stored in memory in the plurality judgment section 705.

The system then uses the internal combustion engine operating point calculation section 702 to control the engine and increases the engine torque by $\Delta T3$ to shift the engine operating point. The system also uses the correction torque calculation section 703 to control the rotating electric machine as the generator and outputs the correction torque $-\Delta T3$. The rotating electric machine is thereby operated as the generator, so that power can be stored in the battery.

When the internal combustion engine shifts to a second operating point as described above, the (diagnostic result 2) is obtained from the output signal from the oxygen sensor at that particular point in time as shown in FIG. 13(B) and stored in memory in the plurality judgment section 705.

The plurality judgment section 705 makes a judgment shown in FIG. 9, so that the diagnosis can be made at a plurality of operating points and diagnostic accuracy can be enhanced.

Details of diagnostic control for step S130 (EV running) of FIG. 10 in the vehicle diagnostic control apparatus according to the embodiment of the present invention will be described below with reference to FIG. 14.

Figure 14:
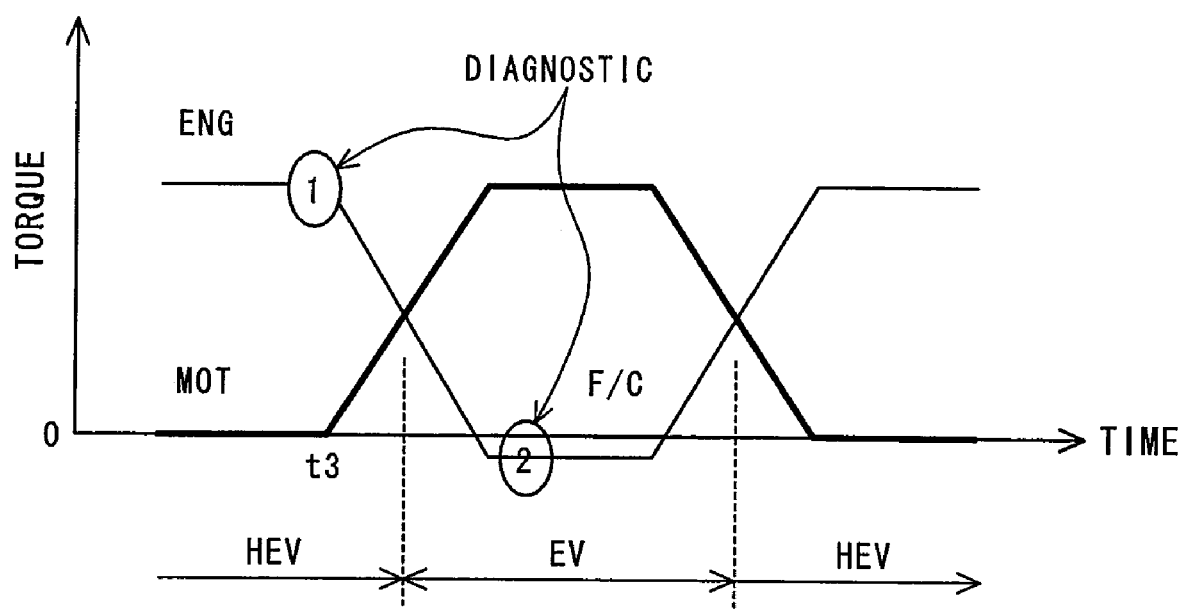
FIG. 14 is a timing chart showing details of diagnostic control for step S130 (EV running) of FIG. 10 in the vehicle diagnostic control apparatus according to the embodiment of the present invention.
Figure 15:
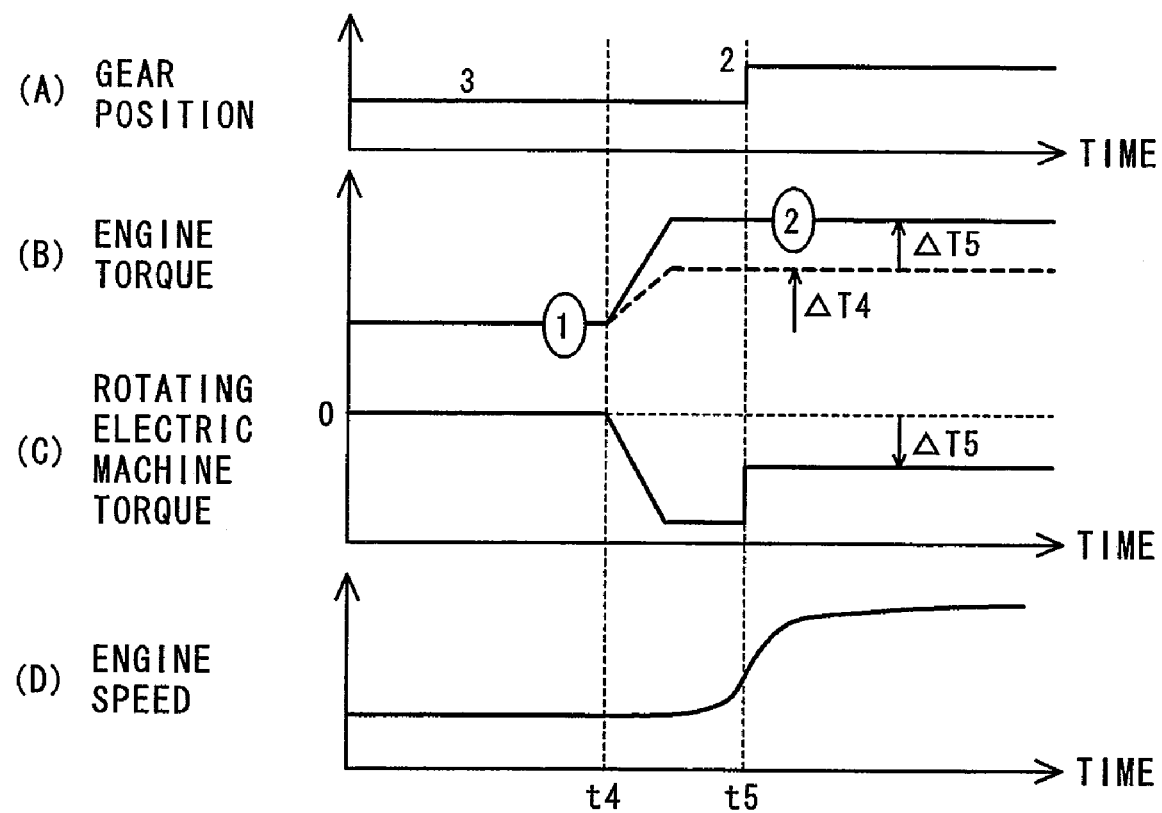
FIGS. 15(A) to 15(D) are timing charts showing details of diagnostic control for step S140 (transmission) of FIG. 10 in the vehicle diagnostic control apparatus according to the embodiment of the present invention.

FIG. 14 is a timing chart showing the details of diagnostic control for step S130 (EV running) of FIG. 10 in the vehicle diagnostic control apparatus according to the embodiment of the present invention.

In FIG. 14, the abscissa represents time. In FIG. 14, the ordinate represents engine torque ENG and motor torque MOT.

When an EV running command is issued at a time t3 shown in FIG. 14, the (diagnostic result 1) is obtained from the output signal from the oxygen sensor at that particular point in time and stored in memory in the plurality judgment section 705.

The system then uses the internal combustion engine operating point calculation section 702 to control the engine and decreases the engine torque to shift the engine operating point. The system also uses the correction torque calculation section 703 to control the rotating electric machine as the motor and outputs the correction torque, so that the rotating electric machine can be operated as the motor.

As the internal combustion engine is stopped by a fuel cut (F/C) to shift to the second operating point as described above, the (diagnostic result 2) is obtained from the output signal from the oxygen sensor at that particular point in time as shown in FIG. 14 and stored in memory in the plurality judgment section 705. Note that the engine torque ENG is negative when the engine is stationary, which is attributable to a friction torque of a flywheel connected to the output shaft of the engine.

The plurality judgment section 705 makes a judgment shown in FIG. 9, so that the diagnosis can be made at a plurality of operating points and diagnostic accuracy can be enhanced.

In the foregoing description of the exemplary embodiment, the diagnosis is made when the running by the internal combustion engine only is switched to that by the rotating electric machine only. The diagnosis may nonetheless be made when the running by the internal combustion engine and the rotating electric machine is switched to that by the rotating electric machine only.

Details of diagnostic control for step S140 (transmission) of FIG. 10 in the vehicle diagnostic control apparatus according to the embodiment of the present invention will be described below with reference to FIGS. 15(A) to 15(D).

FIGS. 15(A) to 15(D) are timing charts showing the details of diagnostic control for step S140 (transmission) of FIG. 10 in the vehicle diagnostic control apparatus according to the embodiment of the present invention.

In FIGS. 15(A) to 15(D), the abscissa represents time. In FIG. 15(A), the ordinate represents gear position. In FIG. 15(B), the ordinate represents engine torque. In FIG. 15(C), the ordinate represents rotating electric machine torque. In FIG. 15(D), the ordinate represents engine speed.

FIGS. 15(A) to 15(D) show the case, in which the vehicle is downshifted from the third speed to the second speed.

When a downshift command is issued at a time t4 as shown in FIG. 15(A), the (diagnostic result 1) is obtained from the output signal from the oxygen sensor at that particular point in time and stored in memory in the plurality judgment section 705.

In response to the downshift from the third speed to the second speed, the system uses the internal combustion engine operating point calculation section 702 to control the engine and shifts the engine operating point. At this time, let $\Delta T4$ indicated by a broken line in FIG. 15(B) be an increase in the engine torque corresponding to the downshift, then the internal combustion engine operating point calculation section 702 controls the internal combustion engine 1 such that the engine torque indicated by a solid line in FIG. 15(B) increases by $\Delta T4+\Delta T5$. Assume, on the other hand, that the rotating electric machine operates neither as a motor nor a generator at this time with its torque being 0. The correction torque calculation section 703 then controls the rotating electric machine as the generator and outputs the correction torque $-\Delta T5$.

When the internal combustion engine shifts to a second operating point as described above, the (diagnostic result 2) is obtained from the output signal from the oxygen sensor at that particular point in time as shown in FIG. 15(B) and stored in memory in the plurality judgment section 705.

The plurality judgment section 705 makes a judgment shown in FIG. 9, so that the diagnosis can be made at a plurality of operating points and diagnostic accuracy can be enhanced.

Note that, for step S150 (lapse of a predetermined period of time) of FIG. 10, the details of diagnostic control are as shown in FIGS. 13(A) to 13(C).

Figure 13:
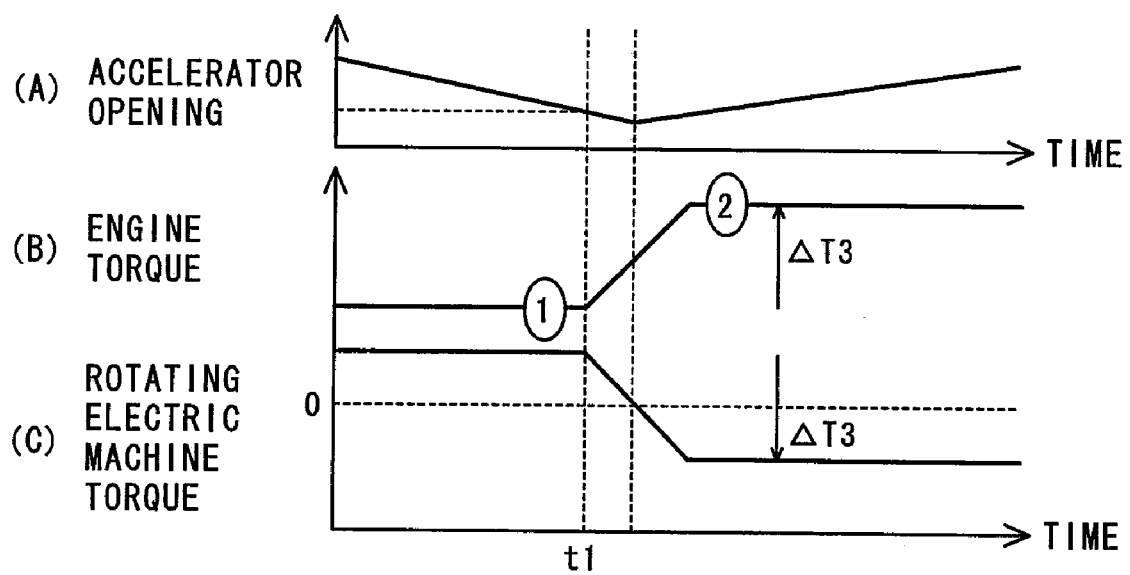
FIGS. 13(A) to 13(C) are timing charts showing details of diagnostic control for step S120 (battery charge amount drop) of FIG. 10 in the vehicle diagnostic control apparatus according to the embodiment of the present invention.

For example, if it is determined at the time t2 shown in FIG. 13 that the predetermined period of time has elapsed, the (diagnostic result 1) is obtained from the output signal from the oxygen sensor at that particular point in time as shown in FIG. 13(B) and stored in memory in the plurality judgment section 705.

The system then uses the internal combustion engine operating point calculation section 702 to control the engine and increases the engine torque by ΔT3 to shift the engine operating point. The system also uses the correction torque calculation section 703 to control the rotating electric machine as the generator and outputs the correction torque −ΔT3. The rotating electric machine is thereby operated as the generator, so that power can be stored in the battery.

When the internal combustion engine shifts to a second operating point as described above, the (diagnostic result 2) is obtained from the output signal from the oxygen sensor at that particular point in time as shown in FIG. 13(B) and stored in memory in the plurality judgment section 705.

The plurality judgment section 705 makes a judgment shown in FIG. 9, so that the diagnosis can be made at a plurality of operating points and diagnostic accuracy can be enhanced.

Details of diagnostic control diagnosing deterioration of the rear oxygen sensor 35 according to the vehicle diagnostic control apparatus according to the embodiment of the present invention will be described below with reference to FIGS. 16 through 18.

Figure 16:
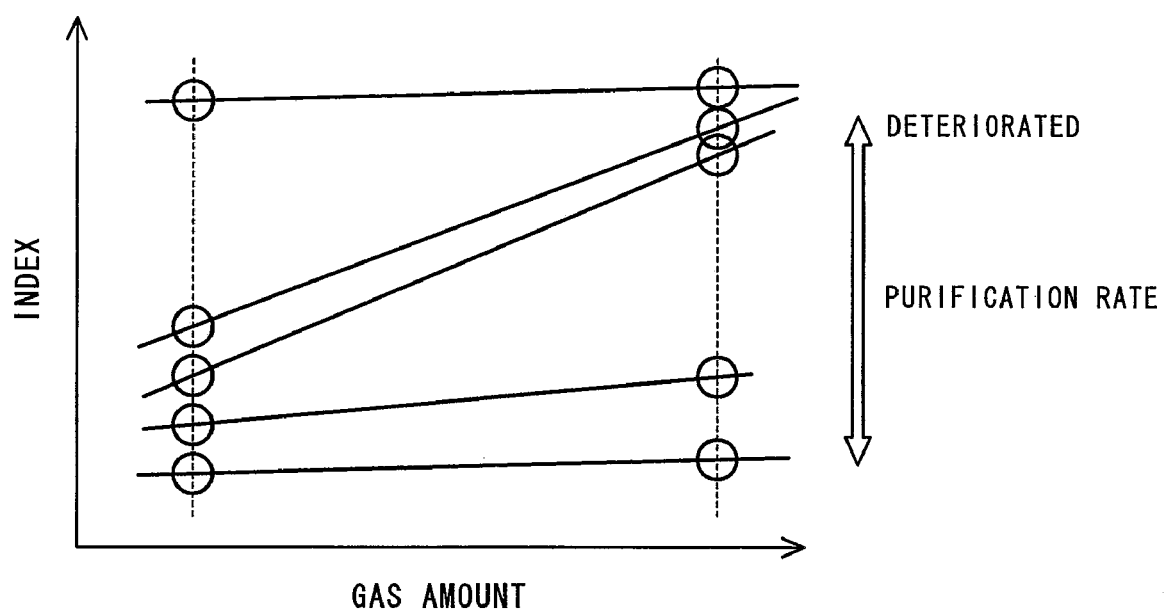
FIG. 16 is a chart for illustrating the principle of diagnosis made for deterioration of a rear oxygen sensor according to the vehicle diagnostic control apparatus according to the embodiment of the present invention.
Figure 17A:
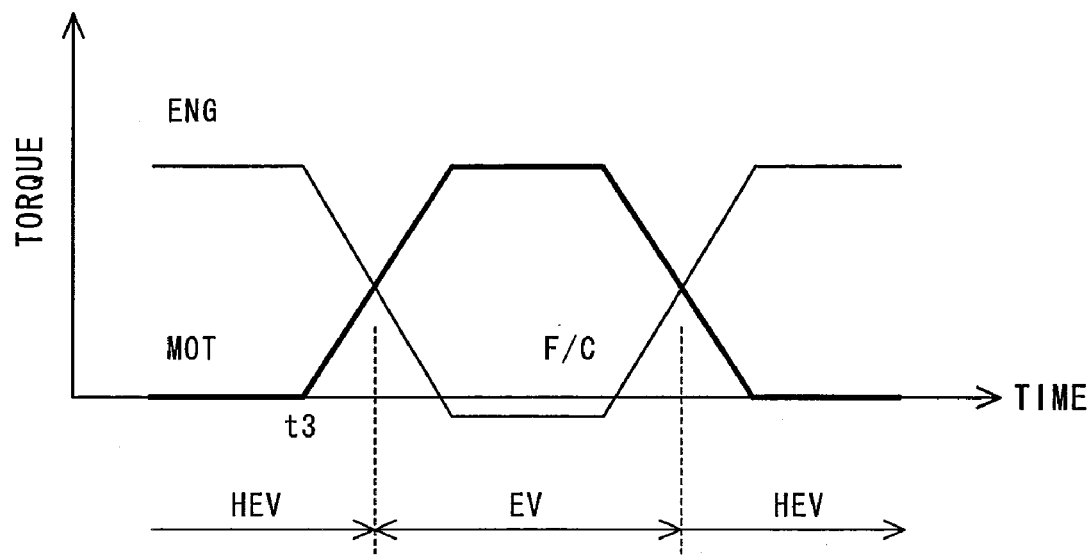
FIGS. 17A and 17B are timing charts showing details of diagnostic control for diagnosis made for deterioration of the rear oxygen sensor according to the vehicle diagnostic control apparatus according to the embodiment of the present invention.
Figure 17B:
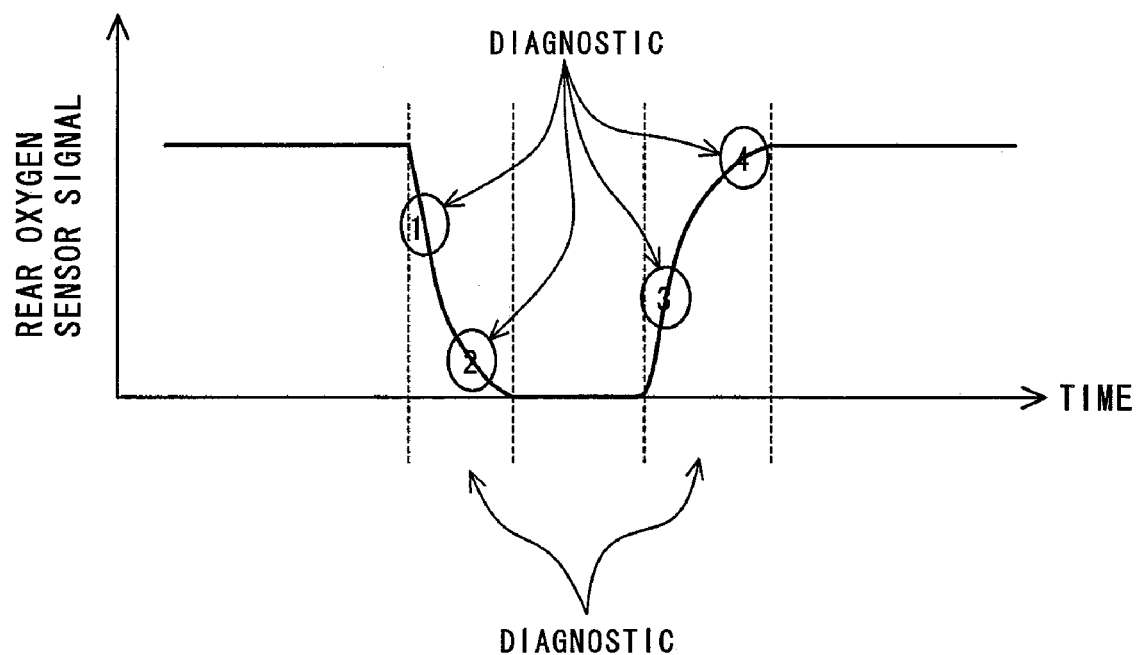

FIG. 16 is a chart for illustrating the principle of diagnosis made for deterioration of the rear oxygen sensor 35 according to the vehicle diagnostic control apparatus according to the embodiment of the present invention. FIGS. 17A and 17B are timing charts showing details of diagnostic control for diagnosis made for deterioration of the rear oxygen sensor 35 according to the vehicle diagnostic control apparatus according to the embodiment of the present invention. FIG. 18 is a chart for illustrating the details of diagnosis made for deterioration of the rear oxygen sensor 35 according to the vehicle diagnostic control apparatus according to the embodiment of the present invention.

The judgment given in FIG. 9 achieves the effect of determining credibility of the diagnostic results with about three divisions. Referring to FIG. 16, with the gas amount laid off as abscissa and the index of detected values corrected according to the gas amount laid off as ordinate, judgment can be made based on FIG. 16. Specifically, calculation results for the large gas amount and the small gas amount are plotted as shown in FIG. 16 based on the plurality of gas amounts and detected values thereof. Then, while the degree of deterioration remains low, the sum of the indices of the large gas amount and the small gas amount is small and the difference or gradient is also small. As the deterioration progresses, the value for the large gas amount becomes greater, which results in a greater sum and gradient (difference) of the two points for the large gas amount and the small gas amount. When the deterioration further progresses, the sum of the two points becomes greater with a smaller gradient. This leads to the following conclusion: specifically, the deterioration can be judged when, for example, the sum of indices at two points is greater than a predetermined threshold value, or when the sum of the two points is smaller than the predetermined threshold value, but the gradient is greater than another predetermined threshold value.

Note that the indices, instead of detected values, are laid off as the ordinate in FIG. 16, because a correction can be made if the detected values correspond nonlinearly to the gas amount, although no such corrections are necessary if the detected values exhibit a linear correspondence relative to the gas amount. It should also be noted that the threshold value can be obtained experimentally. The judgment as described above can be reached through calculations using the gas amounts at two points and the detection results and thus can be easily realized by an ordinary vehicle-mounted electronic control apparatus.

From the values at two points as shown in FIG. 16, it is known that the gradient calculated from the difference between the two points becomes large with a small gas amount and a low index. This permits judgment of the condition at a deterioration start. Consequently, judgment of the start of deterioration can be made by, for example, storing the gradient of the initial condition and calculating the degree of change in the gradient from the initial condition.

The details of diagnostic control for diagnosis made for deterioration of the rear oxygen sensor 35 will be described below with reference to FIGS. 17A and 17B.

The rear oxygen sensor 35 can be diagnosed when a fuel cut is made as shown in FIG. 14. As described earlier with reference to FIGS. 3a) to 3c), the vehicle diagnostic control apparatus according to the embodiment of the present invention incorporates two oxygen sensors disposed before and after the catalyst 33. The front oxygen sensor 34 disposed on the side of the engine exhaust port relative to the catalyst 33 very often exhibits an alternating waveform as shown in FIG. 3a), which makes the diagnosis easy. The rear oxygen sensor 35 disposed downstream of the catalyst 33 exhibits a waveform that alternates very little thanks to the purification action of the catalyst 33. It is therefore difficult to determine deterioration, poor response, or other fault of the rear oxygen sensor 35.

The diagnostic at the plurality of engine operating points as described above makes easy the diagnostic of such a sensor.

FIG. 17A shows the following as FIG. 14. Specifically, when an EV running command is issued at the time t3, the system uses the internal combustion engine operating point calculation section 702 to control the engine and decreases the engine torque to shift the engine operating point. The system also uses the correction torque calculation section 703 to control the rotating electric machine as the motor and outputs the correction torque, so that the rotating electric machine can be operated as the motor.

FIG. 17B shows changes in the signal from the rear oxygen sensor 35 when a fuel cut (F/C) is made. As evident from FIG. 17B, the output waveform of the rear oxygen sensor 35, which does not change normally, changes according to an extreme change in the air-fuel ratio as caused by a fuel cut. The fuel cut is made only when the engine speed is high with the accelerator not depressed, so that the fuel cut is less frequent during running. The fuel cut can, however, be made at any time during cruise running whenever the driving force can be assisted by the rotating electric machine 5.

If a fuel cut is made in a condition of a small gas amount, the signal waveform from the oxygen sensor contains a large percentage of noise, which makes diagnostic difficult. The driving force before and after the fuel cut can be maintained with the rotating electric machine 5. The engine gas amount is therefore increased before the fuel cut to enlarge the width of change of the signal waveform of the rear oxygen sensor 35. The larger width of change of the signal waveform of the rear oxygen sensor 35 enhances the diagnostic accuracy.

Further, because the signal waveform of the rear oxygen sensor 35 is changed greatly by the fuel cut, the rear oxygen sensor 35 can be judged to be normal or faulty at a plurality of timings of the changing period. Results under a plurality of conditions ((diagnostic result 1), (diagnostic result 2), (diagnostic result 3), (diagnostic result 4)) are thereby stored in memory.

FIG. 18 shows a method of determining deterioration of the rear oxygen sensor 35. In FIG. 18, the diagnostic results of four points shown in FIG. 17B are used in cases of shifting to, and returning from, a fuel cut. If the diagnostic results of the first and second points are the same, then the diagnostic results of the third and subsequent points are not considered. If the diagnostic results of the first point differ from those of the second, the judgment of the same diagnostic results at three or more points, if any, is adopted. If the diagnostic results differ between groups of two points, then the diagnosis is made a second time.

As such, the oxygen sensors are diagnosed during changes of a plurality engine operating points, including a fuel cut and a non-fuel cut, for a greater number of diagnoses made, so that the diagnostic accuracy can be enhanced.

The plurality judgment section 705 makes a judgment shown in FIG. 18, so that the diagnosis of the rear oxygen sensor 35 can be made at a plurality of operating points and the diagnostic accuracy can be enhanced.

The diagnostic control unit 700 shown in FIG. 7 also has a function to output the diagnostic results to another device, including a display device for notifying the driver or the like of the diagnostic results or a recording device for recording the diagnostic results. Specifically, referring to FIG. 7, the function can be achieved by outputting the information from the plurality judgment section 705 using a communication line of various sorts. Notification to the driver can be made by wiring lamps or vehicle-mounted display devices for diagnostic purposes.

When the diagnosis is made using a plurality of engine operating points while maintaining a target driving force using the rotating electric machine 5, the rotating electric machine 5 may fail to follow the target driving force if the rotating electric machine 5 is not able to produce an output as expected. This characteristic may be used to estimate the output of the rotating electric machine 5 and thereby diagnose the rotating electric machine 5. Specifically, changing the engine operating points greatly changes the engine output, which results also in a change in the output of the rotating electric machine 5. As long as the rotating electric machine 5 produces an output as expected, the driving force will approximate the target value. A target acceleration value as calculated from the driving force also approaches an actual acceleration value despite vehicle inertia and an observation lag involved therewith. If the rotating electric machine 5 is unable to produce the output as expected, on the other hand, the acceleration remains deviated from the target value or there is a gradually widening difference between the target and actual acceleration values. The rotating electric machine 5 can be diagnosed simultaneously by shifting the engine operating points to a plurality of points as described above.

As described heretofore, in accordance with the vehicle diagnostic control apparatus according to the embodiment of the present invention, setting a plurality of engine operating points allows the number of timings, at which the catalyst, the rear oxygen sensor, the rotating electric machine, and the like can be diagnosed, to be increased and judgments made based on the plurality of diagnostic results enhance the diagnostic accuracy.

What is claimed is:

1. A vehicle diagnostic control apparatus for use in a vehicle having an internal combustion engine and a rotating electric machine as drive power sources and driving a wheel using a driving force of the internal combustion engine and/or the rotating electric machine, the vehicle diagnostic control apparatus comprising:

a diagnostic control means for diagnosing, while controlling, the vehicle, wherein:
the diagnostic control means diagnoses the vehicle by shifting an operating point of the internal combustion engine to a plurality of diagnostic operating points; and
an excess or a deficiency in the driving force accompanied by the shift of the operating point of the internal combustion engine is compensated for by a power running or regeneration operation of the rotating electric machine.

2. The vehicle diagnostic control apparatus according to claim 1, wherein:
the vehicle includes a catalyst disposed at an exhaust pipe, the catalyst for purifying an exhaust gas, and air-fuel ratio sensors disposed upstream and downstream of the catalyst; and
the diagnostic control means judges deterioration of the catalyst using an output from the air-fuel ratio sensors.

3. The vehicle diagnostic control apparatus according to claim 2, wherein:
the diagnostic control means includes a diagnostic start judgment means for judging a diagnostic start based on a vehicle running mode and starts the diagnostic with an output signal from the diagnostic start judgment means.

4. The vehicle diagnostic control apparatus according to claim 3, wherein:
the diagnostic start judgment means judges a diagnostic start at a change in a driving force;
the diagnostic control means, at the change in the driving force, increases the driving force of the internal combustion engine more than a request for the change in the driving force, while decreasing an output of the rotating electric machine in proportion to an amount of the driving force increased; and
the diagnostic control means makes a first diagnosis of deterioration of the catalyst based on the output of the air-fuel ratio sensors before the change in the driving force and a second diagnosis of deterioration of the catalyst based on the output of the air-fuel ratio sensors after the change in the driving force, and judges the deterioration of the catalyst based on results of the first diagnosis and the second diagnosis.

5. The vehicle diagnostic control apparatus according to claim 3, wherein:
the diagnostic start judgment means judges a diagnostic start at a decrease in a battery charge amount;
the diagnostic control means, at the decrease in the battery charge amount, increases the driving force of the internal combustion engine, while letting the rotating electric machine perform a regeneration operation in proportion to an amount of the driving force increased; and
the diagnostic control means makes a first diagnosis of deterioration of the catalyst based on the output of the air-fuel ratio sensors before the increase in the driving force of the internal combustion engine and a second diagnosis of deterioration of the catalyst based on the output of the air-fuel ratio sensors after the increase in the driving force of the internal combustion engine, and judges the deterioration of the catalyst based on results of the first diagnosis and the second diagnosis.

6. The vehicle diagnostic control apparatus according to claim 3, wherein:
the diagnostic start judgment means judges a diagnostic start at a changeover from a running mode by the internal combustion engine only or by both the internal combustion engine and the rotating electric machine to a running mode by the rotating electric machine only;

the diagnostic control means controls to change the running mode from the running mode by the internal combustion engine only or by both the internal combustion engine and the rotating electric machine to the running mode by the rotating electric machine only; and the diagnostic control means makes a first diagnosis of deterioration of the catalyst based on the output of the air-fuel ratio sensors during the running mode by the internal combustion engine only or by both the internal combustion engine and the rotating electric machine and a second diagnosis of deterioration of the catalyst based on the output of the air-fuel ratio sensors after the changeover to the running mode by the rotating electric machine only, and judges the deterioration of the catalyst based on results of the first diagnosis and the second diagnosis.

7. The vehicle diagnostic control apparatus according to claim 3, wherein:

the diagnostic start judgment means judges a diagnostic start at a gearshift;

the diagnostic control means, at the gearshift, increases the driving force of the internal combustion engine more than a request for the change in the driving force after the gearshift, while decreasing an output of the rotating electric machine in proportion to an amount of the driving force increased; and the diagnostic control means makes a first diagnosis of deterioration of the catalyst based on the output of the air-fuel ratio sensors before the gearshift and a second diagnosis of deterioration of the catalyst based on the output of the air-fuel ratio sensors after the gearshift, and judges the deterioration of the catalyst based on results of the first diagnosis and the second diagnosis.

8. The vehicle diagnostic control apparatus according to claim 3, wherein:

the diagnostic start judgment means judges a diagnostic start upon the lapse of a predetermined period of time;

the diagnostic control means, upon the lapse of the predetermined period of time, increases the driving force of the internal combustion engine, while letting the rotating electric machine perform a regeneration operation in proportion to an amount of the driving force increased; and the diagnostic control means makes a first diagnosis of deterioration of the catalyst based on the output of the air-fuel ratio sensors before the increase in the driving force of the internal combustion engine and a second diagnosis of deterioration of the catalyst based on the output of the air-fuel ratio sensors after the increase in the driving force of the internal combustion engine, and judges the deterioration of the catalyst based on results of the first diagnosis and the second diagnosis.

9. The vehicle diagnostic control apparatus according to claim 1, wherein:

the vehicle includes a catalyst disposed at an exhaust pipe, the catalyst for purifying an exhaust gas, and air-fuel ratio sensors disposed upstream and downstream of the catalyst; and the diagnostic control means judges deterioration of the air-fuel ratio sensor, of the two air-fuel ratio sensors, disposed downstream of the catalyst using an output from the air-fuel ratio sensors.

10. The vehicle diagnostic control apparatus according to claim 9, further comprising:

a diagnostic start judgment means for judging a diagnostic start at a changeover from a running mode by the internal combustion engine only or by both the internal combustion engine and the rotating electric machine to a running mode by the rotating electric machine only, wherein:

the diagnostic control means controls to change the running mode from the running mode by the internal combustion engine only or by both the internal combustion engine and the rotating electric machine to the running mode by the rotating electric machine only with a fuel cut for the internal combustion engine; and the diagnostic control means makes a plurality of diagnoses of deterioration of the catalyst based on the output of the air-fuel ratio sensors during the running mode by the rotating electric machine only with the fuel cut for the internal combustion engine and judges the deterioration of the air-fuel ratio sensor downstream of the catalyst based on results of the plurality of diagnoses.

* * * * *